Sept. 29, 1931.  J. F. HINTZ  1,825,524
POULTRY FEEDER
Filed May 31, 1930  3 Sheets-Sheet 1

John F. Hintz INVENTOR
BY Victor J. Evans ATTORNEY

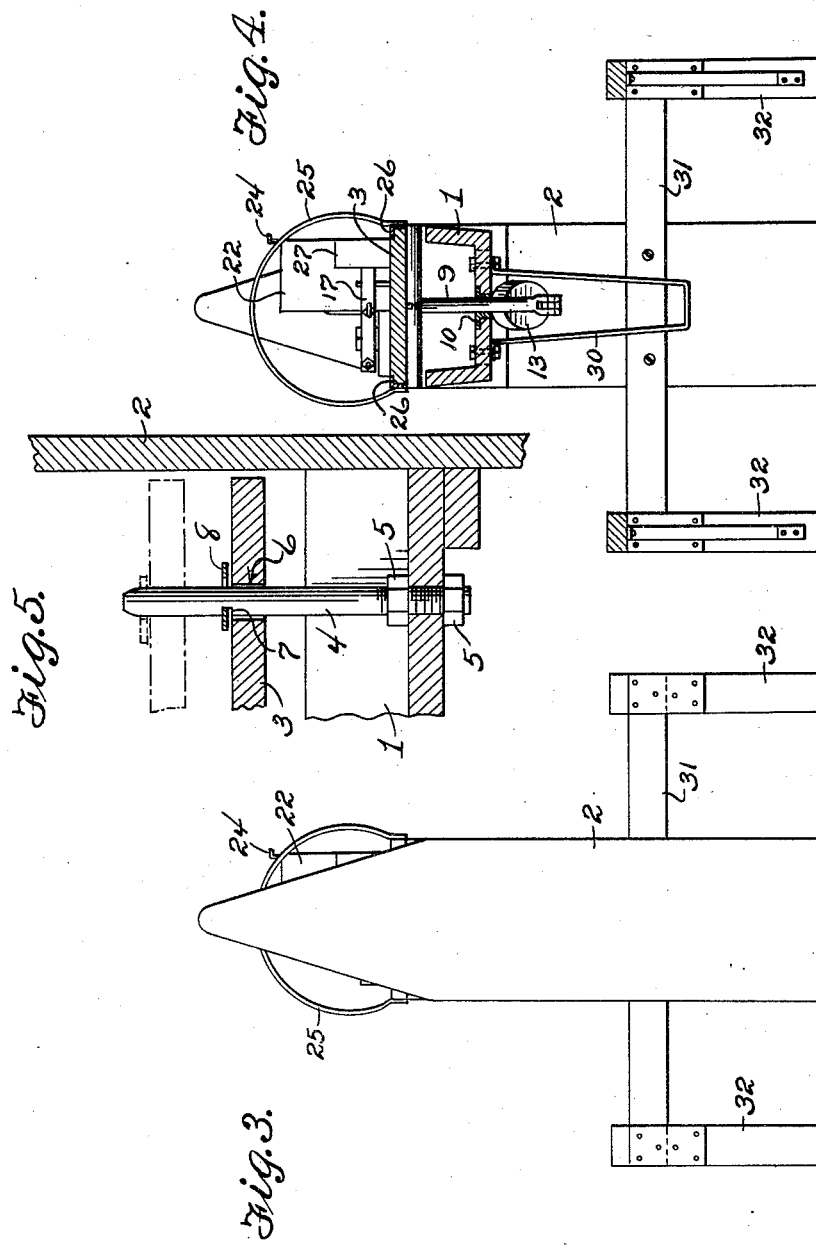

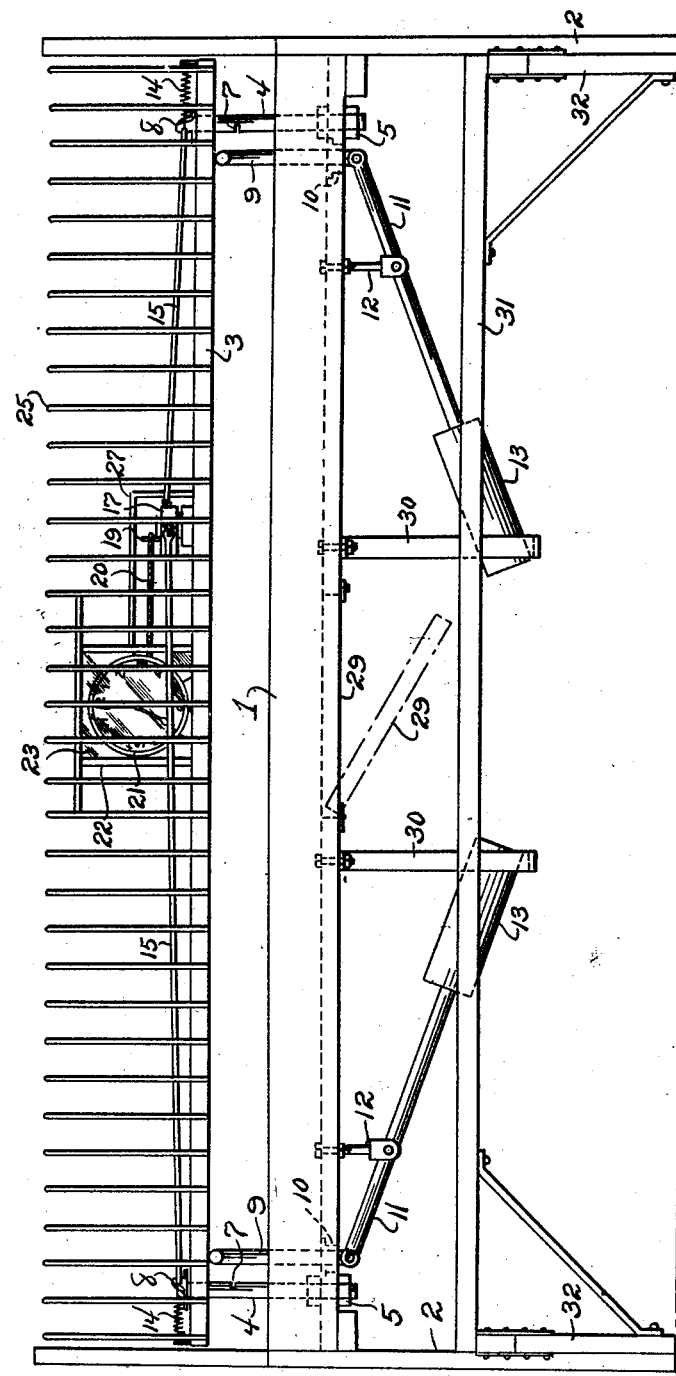

Patented Sept. 29, 1931

1,825,524

UNITED STATES PATENT OFFICE

JOHN F. HINTZ, OF BRILLION, WISCONSIN

POULTRY FEEDER

Application filed May 31, 1930. Serial No. 458,455.

This invention relates to a poultry feeder, the general object of the invention being to provide a cover for preventing the poultry from reaching the feed, with clock operated means for raising the cover at any desired time, whereby the poultry can reach the feed.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 3 is an end view.

Figure 4 is a section on line 4—4 of Figure 2.

Figure 5 is a section on line 5—5 of Figure 1.

Figure 6 is a view similar to Figure 2, but showing the cover in raised position.

Figure 1:
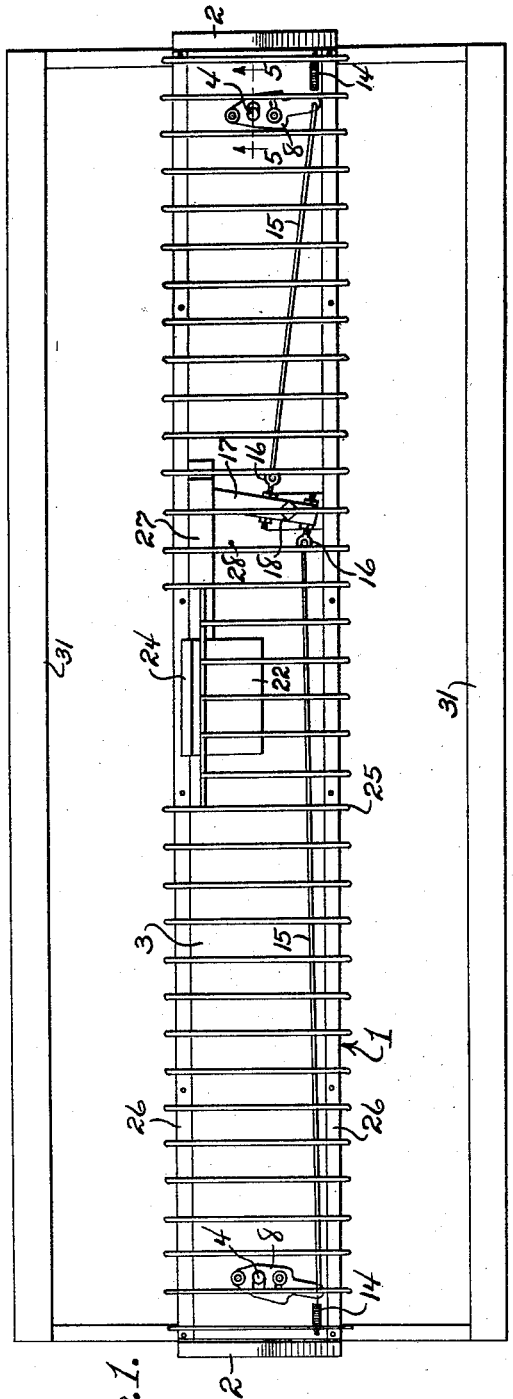
Figure 1 is a top plan view of the invention.
Figure 2:
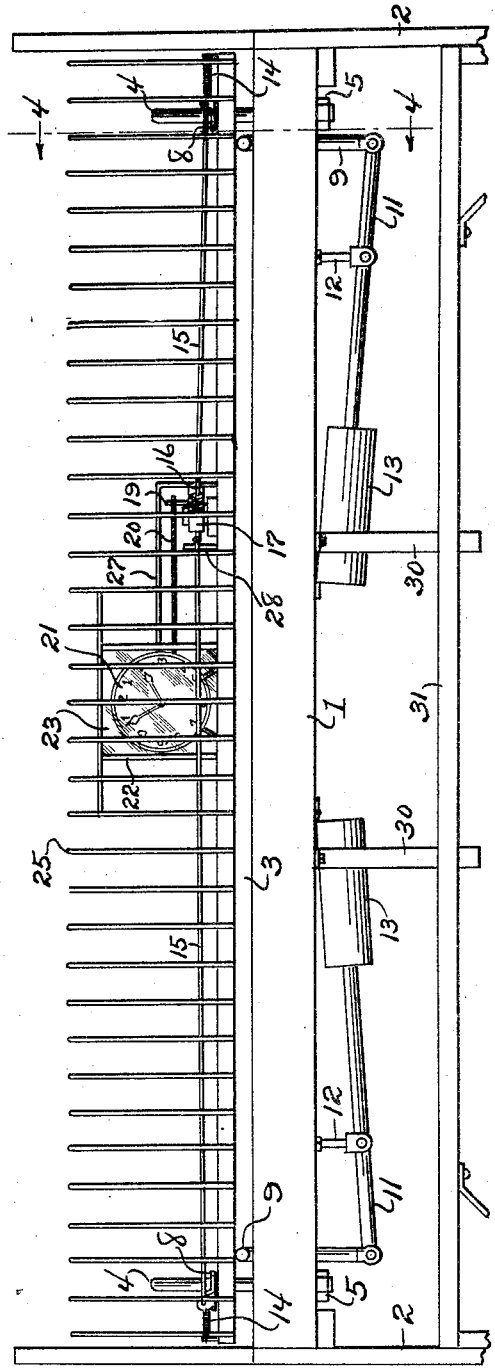
Figure 2 is a front view thereof, with the cover in lowered position.

In these drawings, the numeral 1 indicates a trough which has its sides sloping upwardly and outwardly and the end pieces of which extend downwardly to form the legs 2. These end pieces also extend upwardly a considerable distance above the trough and are ridged, as shown. A cover board 3 is arranged to cover the trough to prevent the poultry reaching the feed therein, this board fitting between the upper ends of the end pieces 1 and being guided for vertical movement on the uprights rods 4 which have their lower ends passing through the bottom of the trough to which they are attached by the nuts 5. The rods pass through holes 6 in the cover board and are each formed with a notch 7 to receive a part of a latch plate 8 pivoted to the board so that these latch plates, when engaging the notches, hold the board in lowered position, this position being slightly above the trough, as shown in Figures 2 and 4.

T-shaped members 9 have their stems passing through bushings 10 in the bottom of the trough and the lower ends of the stems are pivoted to the outer ends of the weighted levers 11 pivoted intermediate their ends to the hangers 12 fastened to the bottom of the trough. Weights 13 are connected with the inner ends of the levers. The cover plate rests upon the T-shaped members and the weights normally hold the cover member in raised position, as shown in Figure 6 and in dotted lines in Figure 5.

The rods 4 pass through holes in the latch plates 8 and a spring 14 normally holds each plate in latching position. A wire or rod 15 connects each plate with an adjusting eye bolt 16 carried by a lever 17 pivoted to the cover board, as shown at 18, the eye bolts being arranged at opposite sides of the pivot so that when the lever is moved in one direction, both of the latch plates will be moved to releasing position. An upright pin 19 on the free end of the lever is connected by a flexible member 20 with the alarm winding key of an alarm clock 21 so that when the alarm begins to actuate, the flexible member 20 is wound on the key thereof and thus the lever is shifted to cause the members 15 to move the latch plates 8 to releasing position so that the weight operated means will lift the cover member to the position it occupies in Figure 6 and thus the poultry can reach the feed in the trough.

The clock is located in a housing 22 carried by the cover member and having a transparent front 23 and a sliding door 24 at its rear which enable the winding keys of the clock to be reached. Curved wire guards 25 are carried by the cover board for preventing poultry from roosting on the board and the ends of these guards are fastened to the angle irons 26 which are connected with the side edges of the cover board so that these irons also act to strengthen the board. As will be seen, some of these guards cover the clock housing and a guard strip 27 covers the free end of the lever and the flexible member 20 so that there is no danger of the poultry stepping on said flexible member. The movement of the lever by the clock is limited by a stop pin 28 carried by the board so that when the lever engages this pin, the alarm mechanism ceases to operate. The upper ends of the leg members 2 extend above the guard members when the cover board is in raised position and thus prevent the poultry from passing into the space between the guard members and the cover board when the cover is in raised position.

The trough is provided with a trapdoor 29 in its bottom for facilitating the cleaning of the trough and downwardly tapered yoke members 30 depend from the bottom of the trough and act as guides for the weights 13. By making these members of tapered shape, they will frictionally engage the weights when the weights are in lowered position so that considerable effort is required to lower the cover board. Thus danger of the cover board being lowered upon the necks of poultry feeding in the trough by poultry roosting on the guard members or other portions of the cover member is eliminated.

A rectangular frame 31 is supported by the legs 32 at the corners thereof, this frame being considerably wider than the trough and the side members of the frame form perches for the poultry feeding from the trough. The end members are fastened to inner sides of the legs 2 by screws or the like.

From the foregoing it will be seen that I have provided a cover for a poultry trough which is normally held in raised position by the weighted levers, but which is held in lowered position by the latch means which are operated by the clock actuated means so that by setting the alarm mechanism of the clock to operate at the desired time, the latches will be moved to releasing position at this time so that the weighted means can raise the cover and thus permit the poultry to reach the feed in the trough. The cover member can be readily removed whenever desire by simply lifting it off the rods 4 after the latch means have been released so that access can be readily had to the trough.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A device of the class described comprising a trough, a cover for the trough, means for normally holding the cover in raised position, latch means for holding the cover in lowered position, cover guiding means passing through the cover and engaged by the latch means and clock controlled means for releasing the latch means at any desired time.

2. A device of the class described comprising a trough, a vertically movable cover for the trough, vertical guide rods carried by the trough and passing through holes in the cover, latch means carried by the cover and engaging parts of the rods for holding the cover in lowered position, weight actuated means for raising the cover when the latch means are moved to releasing position and clock operated means for moving the latch means to releasing position at any desired time.

3. A device of the class described comprising a trough, a vertically movable cover for the trough, vertical guide rods carried by the trough and passing through holes in the cover, latch means carried by the cover and engaging parts of the rods for holding the cover in lowered position, weight actuated means for raising the cover when the latch means are moved to releasing position, clock operated means for moving the latch means to releasing position at any desired time, such means consisting of a lever on the cover, means for connecting the lever with the latch means and a flexible member connected with the lever and to the alarm winding key of a clock.

4. A device of the class described comprising a trough, upright guide rods supported by the trough and having notches therein, a cover board having holes therein through which the guide rods pass, latch members carried by the cover and engaging the notches for holding the cover in lowered position, springs for moving the latch members to latching position, a lever pivoted to the cover, members connecting the lever to the latch members, a clock on the cover, a flexible member connecting the free end of the lever with the alarm key of the clock whereby the actuation of the alarm mechanism will operate the lever and cause the members connected therewith to move the latch members to releasing position. T members passing through the bottom of the trough and having their heads engaging the under side of the cover, a weighted lever connected with the lower end of each T-shaped member, means for pivotally supporting the levers from the under side of the trough and downwardly tapered guiding means connected with the trough and in which the weights operate, the lower ends of the members frictionally engaging the weights, whereby the cover must be pushed downwardly with considerable effort to release the weights from the lower ends of the guiding member.

5. A device of the class described comprising a trough, a cover for the same, means for normally holding the cover in raised position, latch means for holding the cover in lowered position, a clock carried by the cover, means operated by the alarm mechanism thereof for moving the latch means to releasing position, curved guards carried by the cover for preventing poultry roosting on the same, some of said guards covering the clock and the means actuated thereby and a trap-door in the bottom of the trough.

6. A device of the class described comprising a trough, a cover for the same, means for normally holding the cover in raised position, latch means for holding the cover in lowered position, a clock carried by the cover, means operated by the alarm mechanism thereof for moving the latch means to releasing position, reinforcing members at the sides of the cover, curved guards connected with the members and extending over the cover for preventing poultry roosting on the same, some of said guards covering the clock and the means actuated thereby and a trapdoor in the bottom of the trough.

In testimony whereof I affix my signature.

JOHN F. HINTZ.